Aug. 22, 1967
H. F. POPPENDIEK ETAL
3,336,804
MEANS AND TECHNIQUES USEFUL IN FLUID FLOW DETERMINATIONS
Filed March 9, 1964
3 Sheets-Sheet 1
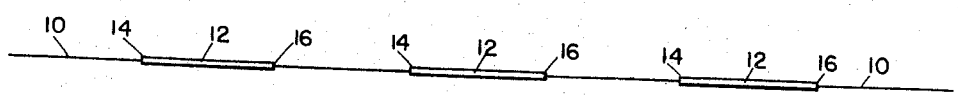
Fig. 1
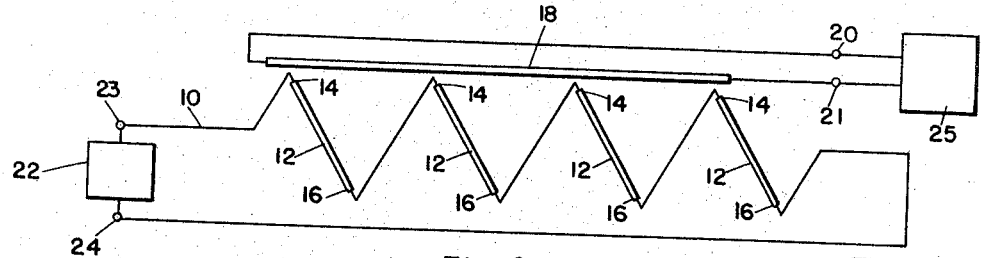
Fig. 2
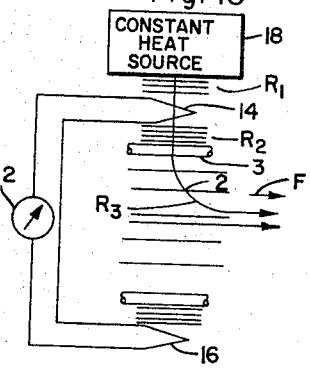
Fig. 13
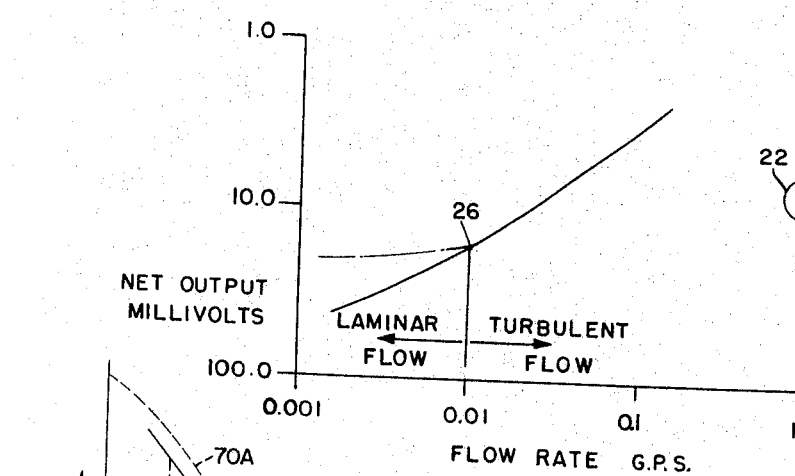
Fig. 3
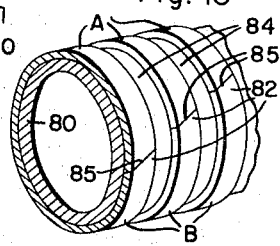
Fig. 15
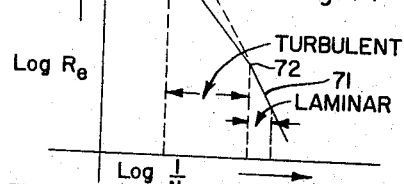
Fig. 14
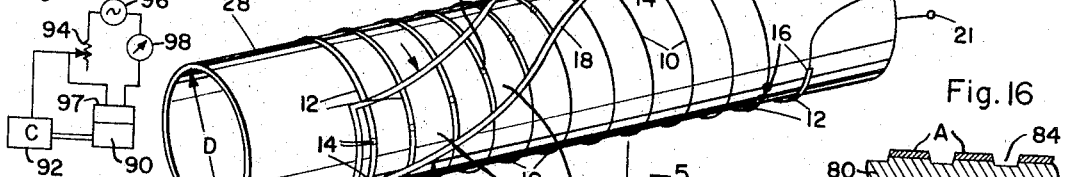
Fig. 16
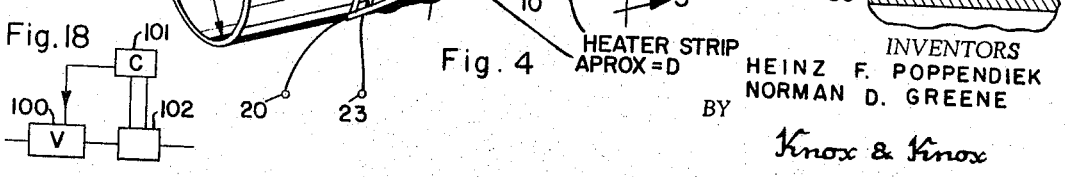
INVENTORS
HEINZ F. POPPENDIEK
NORMAN D. GREENE
BY
Knox & Knox

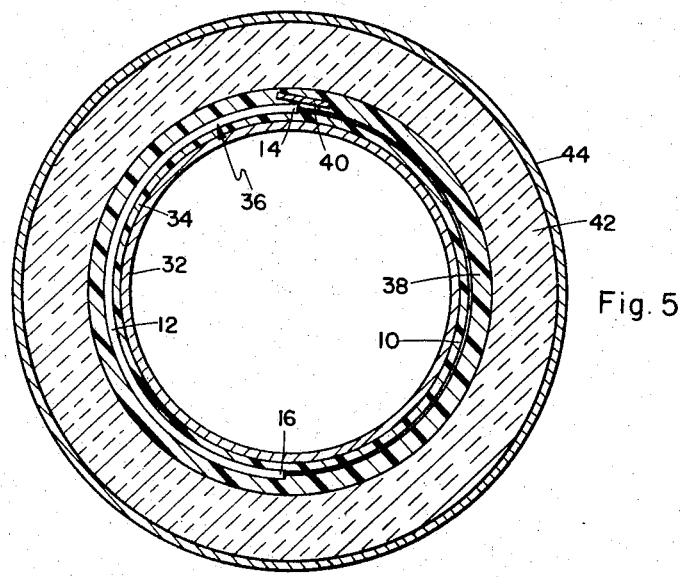
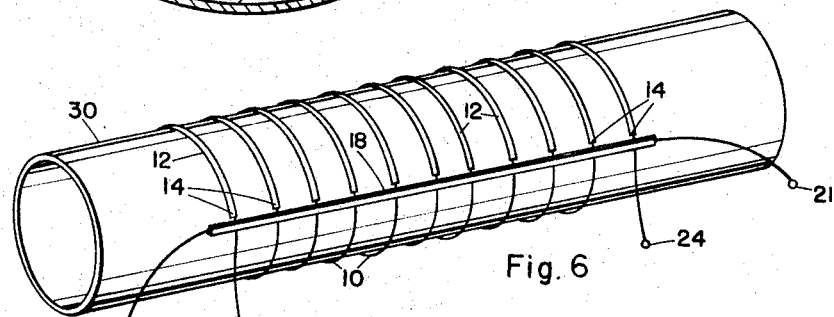
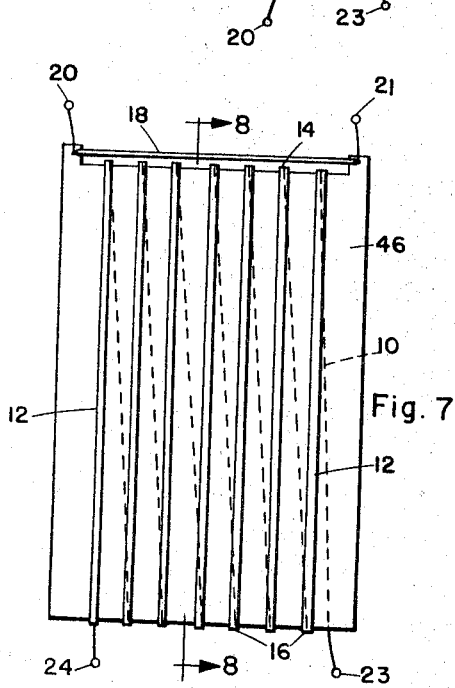 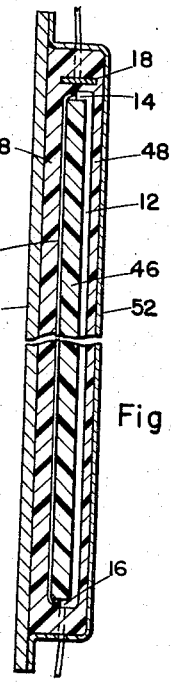
INVENTORS
HEINZ F. POPPENDIEK
NORMAN D. GREENE
BY
Knox & Knox INVENTORS
HEINZ F. POPPENDIEK
NORMAN D. GREENE
BY
Knox & Knox 3,336,804
MEANS AND TECHNIQUES USEFUL IN FLUID FLOW DETERMINATIONS
Heinz F. Poppendiek, 8686 Dunaway Road, La Jolla, Calif. 92037, and Norman D. Greene, Rte. 1, Box 148, Sun Valley Road, Del Mar, Calif. 92014
Filed Mar. 9, 1964, Ser. No. 350,947
9 Claims. (Cl. 73—204)

This application is a continuation-in-part of copending application Ser. No. 302,875, filed Aug. 19, 1963, entitled "Thermoelectric Liquid Flow Meter" now abandoned.

The present invention involves generally new means and techniques useful in accurately determining, measuring, indicating or recording fluid flow, either in turbulent or laminar flow, and either in continuous or in sporadic, pulsating or droplet form; and such means and techniques, as described herein for exemplary purposes, involve generally the use of hot and cold thermocouple junctions related in a unique manner with a heat source and the fluid whose flow is to be determined.

The term "fluid" is used herein in its broadest connotation to include, for example and not by limitation, such common fluids as: water, gas, air, steam; industrial fluids such as: slurries, coal in water, slurries in suspension and cement; biological fluids such as: blood and urine; and even metal fluids such as: mercury, potassium, sodium and lithium.

In certain forms of the invention, as exemplified herein, such fluid may be confined as, for example, to flow within a conduit in which case the thermocouples are mounted on such conduit, and in other forms of the invention where the fluid may or may not be confined, the thermocouples may be mounted on a rod or plate or other structure which is immersed in the fluid flow path.

In accordance with important features of the present invention, fluid flow is determined with respect to the resistance which such fluid presents to the flow of heat therethrough. An artificial heat source, supplied electrically with power of one watt or less to inappreciably raise the temperature of the fluid, is controlled to supply a constant heat flux into the fluid flow through a heat path which includes a thermocouple hot junction. A related thermocouple cold junction senses the fluid temperature, the same being not affected by the low power heating source. Because of the positioning of the thermocouple hot junction in the constant heat flux path, its temperature and hence its voltage is dependent upon the fluid flow rate, the greater the fluid flow rate, the lower the temperature of the hot junction and hence the lower is its voltage. A voltage sensitive device such as, for example, a voltmeter is connected between the hot and cold junctions to indicate the differential voltage therebetween, and thus provides indications of the fluid flow rate referenced with respect to the temperature of the fluid, i.e. referenced with respect to the cold junction temperature or voltage.

In accordance with other features of the present invention, a multiplicity of hot and cold junctions are so provided to produce relatively large output voltages and currents consistent with the use of a low power heating source, all of the heat from which is carried away by the fluid flow without significantly raising fluid temperature and with the temperature difference between the hot and cold junctions being relatively small to avoid free heat convection effects.

In accordance with still other features of the present invention, the multiplicity of hot and cold junctions are spatially related to each other and to the fluid flow such that the combined output of the thermocouples, either a voltage or a current signal has a useful significance not only for turbulent fluid flow but also for laminar fluid flow, with the former producing proportional signals in accordance with the .8 power of fluid flow (turbulent flow) and the latter producing proportional signals in accordance with the .3 power of fluid flow (laminar flow) and with significant useful signals being developed at the transition between turbulent and laminar flow.

Still other features of the present invention involve the fact that the lower the fluid rate, the greater is the output signal which is particularly advantageous when the system is used for measuring, indicating or for effecting a control at low flow rates as, for example, in a leak detector.

Yet other features of the present invention, as indicated above, involve the use of a multiplicity of hot and cold junctions to mitigate or obviate any problems which would otherwise arise from heat flow paths other than the desired direct useful heat path into the fluid.

Yet another feature of the present invention involves the provision of a multiplicity of thermocouple junctions strategically located with respect to each other and to the expectant fluid path to produce a stable output signal representative of average conditions.

Still a further feature of the present invention is that no moving parts need be involved and that all components of the measuring system need not be in the fluid path.

A further feature of the present invention is that it is productive of a highly sensitive temperature compensated device.

Yet another feature of the present invention is that it is productive of a device having fast response and good stability which when built to incorporate a multiplicity of thermocouple junctions will not, in spite of its fast response, result in the indication or recording of fluid oscillations or local distortions in the fluid velocity profile.

Another feature of the present invention is that it is productive of a device which is substantially free from free convection effects and has a low time constant shorter indeed than the time constant of a conventional D'Arsonval movement of a voltmeter or ammeter used to indicate the fluid flow.

Another feature of the present invention involves the use of a hot and a cold junction thermocouple system with both junctions being influenced by the fluid yet without free heat convection currents being developed between such junctions.

It is therefore a general object of the present invention to provide novel means and techniques whereby one or more of the above indicated features are realizable.

A specific object of the present invention is to provide a novel flow meter having wide ranges of uses.

Another specific object of the present invention is to provide novel thermopile constructions particularly useful in connection with the control, indication, determination or measurement of fluid flow.

Another specific object of the present invention is to provide a novel method of determining fluid flow conditions.

Another specific object of the present invention is to provide a system of this character which is relatively simple and inexpensive and which is rugged and trouble-free in operation.

Another specific object of the present invention is to provide a system of this character which is usable for both laminar and turbulent fluid flow and whether or not such fluid flow be continuous, sporadic or as, for example, in droplet form.

Another specific object of the present invention is to provide a system of this character which produces a greater output signal for smaller fluid flows.

Another specific object of the present invention is to provide a novel flow tube.

Another specific object of the present invention is to provide novel devices which may be placed in the flow stream for determination of relative velocities.

Another specific object of the present invention is to provide a device for indicating a vehicle's relative speed through a fluid.

Another specific object of the present invention is to provide a system of this character wherein the sensing means is omnidirectional with respect to the fluid flow.

Another specific object of the present invention is to provide devices of this character which are usable in an aircraft stall indicating system.

Another specific object of the present invention is to provide devices of this character particularly useful in monitoring breathing rates in respirometer systems and also, for example, in basal metabolism studies.

Another specific object of the present invention is to provide devices of this character particularly useful in fuel lines in an automobile for indicating or measuring gasoline consumption.

Another specific object of the present invention is to provide means and techniques useful in the construction of thermopiles.

Another specific object of the present invention is to provide a thermoelectric flow meter that does not generate appreciable or significant free convection currents between hot and cold junctions and is capable of sensing fluid flow at flow rates very much below the slowest rate measurable by existing thermocouple type fluid flow meters.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a diagrammatic view of a typical electroplated thermopile constructed in accordance with a feature of the present invention;

FIG. 2 is a diagrammatic view of a thermopile of FIG. 1 arranged for heating in accordance with other features of the present invention;

FIG. 3 is a graph illustrating the response characteristics of the heated thermopile used as a fluid flow meter;

FIG. 4 is a perspective view of a thermopile applied to a tubular fluid duct in accordance with other features of the present invention, the insulative material being omitted for clarity;

FIG. 5 is an enlarged sectional view taken on line 5—5 of FIG. 4 and including the insulative material;

FIG. 6 is a perspective view of a modified form of FIG. 4 also embodying features of the present invention;

FIG. 7 is a front view of a plate mounted thermopile embodying features of the present invention;

FIG. 8 is an enlarged sectional view taken on line 8—8 of FIG. 7 and including the mounting means;

FIG. 13 illustrates in schematic form the relationship of elements illustrated in FIGS. 2 and 4.

FIG. 14 is a graphic representation of conditions which may exist in use of the arrangements shown, for example, in FIGS. 4, 7 and 8.

FIGS. 15 and 16 illustrate an arrangement whereby hot and cold junctions, present in the previously described figures, may be produced.

FIG. 17 illustrates a system using, for example, the construction shown in FIG. 4 with means provided for changing input heating power.

FIG. 18 illustrates a system using, for example, the construction shown in FIG. 4 for maintaining a constant flow.

Figure 9:
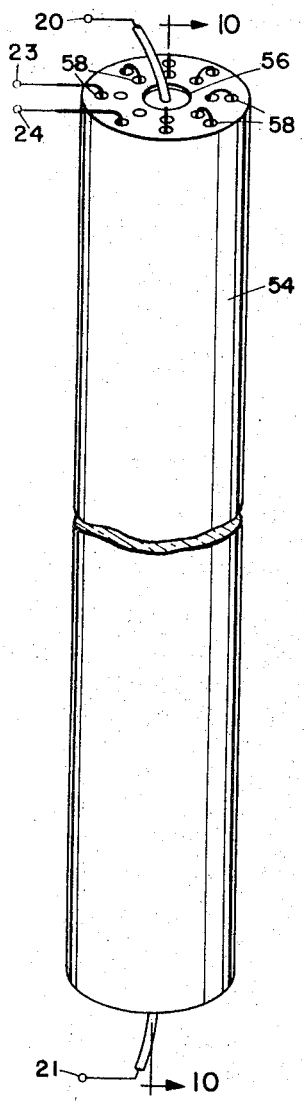
FIG. 9 is a perspective view of a rod type thermopile unit also embodying features of the present invention.

To provide thermocouple junctions of uniform cross-section with interconnecting conductors of uniform conductivity, the thermopiles, as illustrated in FIG. 1, are formed by electroplating methods. A wire 10 of given conductivity and other suitable characterstics for use in thermopiles, such as constantan, has plated in alternate sections 12 thereon another metal of greater conductivity, such as silver or copper. In this manner, a thermocouple junction 14 is formed at the beginning of each plated section 12, and another thermocouple junction 16 is formed at the end of each plated section 12. Thus, thermocouple junctions 14 and 16 are formed with uniform characteristics and alternate sections of constantan and constantan plated with silver or copper provide uniform conductivity between adjacent thermocouple junctions, all elements being connected in series.

According to one of the novel features of the instant invention, as illustrated in FIG. 2, in all embodiments described herein, the thermopile is arranged so that all thermocouple junctions 14 are grouped adjacently and all thermocouple junctions 16 are grouped adjacently. This arrangement permits heating all junctions in one group with one simple heating element 18, such as a single section in Nichrome wire or the like. This arrangement also concentrates a maximum number of junctions in a given space, provides uniform separation and exposure of both heated and cold junctions to fluids being measured, and is particularly adaptable to measurement of both laminar and turbulent fluid flow as hereinafter described. Heating element 18 is connected to terminals 20 and 21 and further connected to a regulated electrical power source 25, which may be either AC or DC, preferably regulated both as to voltage and current to assure a constant power dissipation in element 18, regardless of aging or other effects which may result in changing the ohmic resistance of element 18. It may be sufficient to regulate source 25 only as to produce a constant applied voltage to element 18 such that there be some assurance that a constant amount of heat flux be produced for the purposes described hereinafter. The series-connected thermopile is also connected to a measuring, indicating or control device 22 by means of the free ends of constantan wire 10 and terminals 23 and 24 for developing an output signal, either voltage or current representative of the net differential voltage between the hot and cold junctions.

Device 22 may be any suitable measuring and indicating device known in the art, and may be a potentiometer or galvanometer type meter. As is well known, heating thermocouple junctions 14 develops a difference of electrical potential or voltage between hot junctions 14 and cold junctions 16, the voltage thus developed being multiplied by the number of thermocouple junction pairs connected in series in the thermopile, making the thermopile considerably more sensitive than the single thermocouple. Consequently, device 22 may be calibrated to measure and indicate the voltage output of the thermopile.

Some of the principles of the present invention are described in connection with FIG. 13 which, for purposes of simplicity, includes only one hot junction 14, one cold junction 16 in relation to the heating wire 18 which is represented as a heat source and producing a constant heat flux in the path indicated by line 2. This heat flux path 2, as illustrated, extends in turn from wire or source 18 through some insulation having a thermal resistance $R_1$ through hot junction 14, through some insulation having a thermal resistance $R_2$ (which is considered to include the wall of circular duct 3 through which the fluid F flows) and into the fluid F having a thermal resistance $R_3$, the fluid F serving essentially as a heat sink carrying away all heat developed in source 18 without such heat having any influence on the temperature sensed by the cold junction 16 and without such heat significantly raising the temperature of the fluid.

The temperature of cold junction 16 is established by the temperature of the fluid F since it is in temperature equilibrium with it. It will thus be seen that the constant heat flux (analogous to a constant current in an electrical system) establishes temperature conditions at the junction 14 in accordance with the relative values of thermal resistance $R_1$, $R_2$ and $R_3$, but it is assumed that $R_1$ and $R_2$ remain constant. The other resistance $R_3$ varies in accordance with the flow rate of fluid F such that the higher the fluid flow rate, the lower the resistance $R_3$ with the result that this constant heat flux causes the temperature of junction 14 to be lowered and a smaller voltage to be indicated on meter 22. Conversely, as the fluid flow rate decreases, $R_3$ increases, the temperature of junction 14 increases and the reading on meter 22 increases.

Thus, the thermopile is placed in thermal contact with a flowing fluid, such as water or air, to change the temperature of the hot junction in accordance with the fluid rate of flow. While the temperature of the fluid might also change and affect the output, this affect is avoided because both hot junction 14 and cold junction 16 are placed in thermal contact with the fluid and the two groups of junctions are equally affected, one compensating for the other. Thus, the temperature change is entirely dependent on the fluid rate of flow and substantially independent of fluid temperature. Consequently, thermocouple juntcions 14 having been heated to a constant temperature by heating element 18 to produce a constant voltage output without fluid flow, i.e. under static flow conditions, the voltage output thereafter varies with fluid rate of flow; and device 22 may be calibrated in terms of fluid rate of flow or, as hereinafter described, in terms of vehicle relative speed in a fluid, such as water or air.

In one application of the instant invention, fluid rate of flow in ducts is measured and indicated. In general, fluid flow in ducts is laminar at slow speeds and turbulent at fast speeds. In laminar type flow, fluid in contact with the duct wall is slowed down by friction, the rate of flow increasing from a minimum, i.e. zero, at the duct wall to a maximum at the duct axial center, the rate varying parabolically. In turbulent type flow, the fluid velocity curve is nearly uniform across the duct because of the eddying or turbulent mixing within the fluid. As a result of these flow characteristics, a duct fluid flow meter is not practical for both turbulent and laminar flow conditions unless means described later in connection with FIG. 4 are provided.

A graph showing the response characteristics of two embodiments of the instant invention is shown in FIG. 3. The solid curve shows the response characteristic for the embodiment illustrated in FIG. 4. In the turbulent flow region to the right of point 26, the curve is identical for both this embodiment in FIG. 4 and the one illustrated in FIG. 6. To the left of point 26 in the laminar flow region, however, the broken portion of the curve for the embodiment of FIG. 6 shows that this embodiment is insensitive in the laminar flow region. This decreased sensitivity would cause the device to indicate in the laminar flow region small changes in signal with large flow rates, i.e. any calibration curves would have marked disproportionality in the turbulent and laminar regions. It should also be noted that normally the heat transfer conductance (consequently the radial temperature difference) in a laminar flow heat convection system is not a function of the Reynolds number (or the fluid velocity) in the established flow regime. However, the conductance and the radial temperature difference is a function of the flow rate in the entrance region where the boundary layers have not yet become established. Consequently, as described below relative to the embodiment of FIG. 4, the loci of the hot and cold junctions spiral helically along the duct wall. Such a geometry creates new thermal boundary layers over the heated thermopile junctions, thus making the temperature difference a function of fluid velocity when the flow is laminar.

The means employed for compensating for decreased sensitivity in the laminar flow region will now be described with reference to FIGS. 4 and 6 in which the structure of FIG. 2 is shown wound helically on tubular ducts 28 and 30, respectively. Referring first to FIG. 6, thermocouple junctions 14 are spaced and disposed longitudinally adjacent the inner or the outer surface of tubular duct 30, thermocouple junctions 16, not shown, being similarly arranged adjacent the diametrically opposite inner or outer surface of duct 30. Heater element 18 is arranged in thermal contact with junctions 14 and terminals 20, 21, 23 and 24 are provided for connection to a power source and an indicating device as in FIG. 2. As hot junctions 14 are arranged in one line, the same longitudinal small section of fluid in the laminar flow region cools each hot junction successively, the fluid temperature in this small section being raised progressively (laminar thermal boundary layer becoming more established) with resultant progressive loss of signal or thermopile output. This results in the thermopile response represented by the broken line portion of the curve to the left of point 26 in FIG. 3.

Now, in contrast, referring to FIG. 4, the structure here is precisely the same as in FIG. 6 except that the hot junctions 14, cold junctions 16, and heating element 18 are arranged in a spiral pattern adjacent the inner or outer circumference of tubular duct 28. Now it should be apparent that fluid warmed by the first hot junction 14 in the thermopile flows past to the side of the other hot junctions, consequently, fluid in laminar flow is warmed only once by staggered hot junctions. As a result, increased temperature imparted to the fluid by a heated-junction as in the case in FIG. 6 does not reduce the cooling ability of the fluid coming in contact with successive heated junctions. This feature results from the new boundary layer initiation discussed above in conjunction with FIG. 3. Therefore, the output of the thermopile in the laminar flow region, as represented by the solid portion of the curve to the left of point 26 in FIG. 3, is dependent entirely on the fluid rate of flow.

The embodiment of FIG. 6 is suitable for use as a duct flow meter for fast flowing fluids, which always flow in the turbulent flow region. The embodiment of FIG. 4 is suitable for both slow and fast flowing fluids in both the laminar and turbulent flow regions.

While FIGS. 4 and 6 show schematically features of two embodiments of the instant invention applied to duct fluid flow meters, the specific structure of the two embodiments is more clearly illustrated in FIG. 5. Duct 32 is preferably of metal, although any material with suitable thermal conductivity may be used. The thermopile is electrically insulated from duct 32 and heater element 18, but thermally connected to both. One method of construction found suitable deposits successive coatings of electrically insulative but thermally conductive material, such as an epoxy, as required. Using this method, the structural strength necessary to withstand pressure of the fluid flowing in duct 32 may be provided in the duct alone or in combination with the built up structure. The thermopile may be wound on an extremely thin duct composed usually of an epoxy or on a duct coated with an insulating material such as, for example, an epoxy, with strength merely sufficient to support the thermopile prior to adding the successive, strengthening coatings. This structure provides efficient cooling and high sensitivity. During manufacture, the electroplating process is performed after installing the wire on duct 32. As illustrated, duct 32, composed of metal, epoxy, or other material, has deposited or installed thereon epoxy coating 34 or any other good electrical insulating material, thermopile 36, as illustrated in FIGS. 4 and 6, epoxy coating 38 surrounding heating element 40, thermal insulation 42 and protective outer jacket 44. Thermal insulation 42 prevents the heat from heating element 40 from flowing radially outwardly, i.e. external to the system, and may be of any suitable material, such as spun glass or synthetic fiber. Jacket 44 confines thermal insulation 42, serves as both a protective and decorative cover and pressure containment for the fluid flow meter, and may be of any suitable material such as metal or plastic.

In a typical construction, the tube 32 may be of metal, .005 inch wall thickness, and have a diameter of from one eighth inch to diameters measured in terms of feet. When a metal tube is used, it is coated with an electrical insulating material to provide a coating of less than .001″ thickness, and such material may be a thermosetting plastic resin having good heat conductivity consistent with good electrical resistance. The thermocouple wire of, for example, constantan, iron or platinum of, for example, single strand No. 36 gauge wire is wound over the coating with a pitch of, for example, 40 to 100 turns per inch. This wound wire is then selectively masked with electrical insulating material, i.e. that part of the wire which is not to be electroplated is masked. The masking material may be a paint or a wax. Also such mask may be a strip spirally wound to give a "barber pole" appearance with the width of such strip being approximately 1.1 times the diameter of the tube. This particular ratio of 1.1 results, after subsequent electroplating of the exposed wire, in the immediately adjacent hot and cold junctions being spaced apart 180 degrees as seen radially of the tube.

After the wire is thus masked, the assembly is dipped in a plating bath to plate a complementary thermocouple material as, for example, copper, silver, platinum or gold with the requirement that the electrical conductivity of the plating material be much larger than the conductivity of the unmasked wire on which it is plated. The ratio of conductivities may, for example, be 30. If the specific conductivity of the plating material is too low, its plated thickness may be increased to obtain the desired conductivity ratio. This plating results, as indicated in FIG. 1, in a series arrangement which in turn in this order includes: unplated wire, a shorted section of wire at the ends of which the hot and cold junctions are, unplated wire and a shorted section, etc., to form a thermopile comprising a multiplicity of hot and cold junctions.

A thin layer of electrical insulating material of relatively good thermal conductivity is applied over alternate junctions, i.e. hot junctions, and then a thin ribbon of Nichrome "wire" having, for example, a thickness of .001 inch and a width of, for example, one-half to one times the diameter of the tube is wound over hot junctions in a spiral path, as indicated in FIG. 4, with the last mentioned insulating material sandwiched therebetween. Thereafter, the outer portion of the assembly is heat-insulated to assure a flow of heat radially into the tube and into the fluid therein, as indicated previously in connection with FIG. 13. Only a small amount of heating power is applied to the Nichrome strip, one watt or less, for reasons indicated previously.

The flow tube may have, for example, approximately 40 junctions per inch amounting to approximately 200 junctions in a five inch tube with a voltage output of approximately five millivolts. When a current sensitive measuring or control device is used, it is preferred that impedance matching be observed to obtain a match with the thermopile which may have an ohmage ranging from 50 to 1000 ohms depending upon the thermopile wire used.

Theoretical or mathematical considerations have been correlated with the performance of the systems shown in FIGS. 4 and 6 and found to be in agreement with respect to turbulent flow in FIG. 6 and with respect to both turbulent and laminar flow in FIG. 4, as now described in connection with FIG. 14, which is a log-log plot of abscissae proportional to temperature differential or output voltage and ordinates proportional to fluid flow volume or weight. It will be noted that this log-log plot includes two straight lines 70 and 71 intersecting at a point 72 marking the transition point between turbulent and laminar flow. The lines 70 and 71 have a negative .8 and a negative .3 slope corresponding to exponents in mathematical equations applicable respectively to turbulent and laminar flow, as discussed later. It will be seen that in general as the flow rate decreases, the thermopile temperature, correspondingly the output signal increases making the system particularly useful at low flow rates including sporadic flow as, for example, in droplet form.

These above indicated mathematical expressions having these exponents are developed on the basis of physical conditions represented in FIG. 13, the basic equation for which may be expressed as:

$$\frac{Q}{A} = \frac{t_1 - t_m}{R_W + \frac{1}{h}}$$

which in general follows analogously Ohms law for an electrical circuit where the quantity $Q/A$ is representative of heat flux (current); $t_1 - t_m$ is a temperature difference (voltage), and $$R_W + \frac{1}{h}$$

is the resistance to heat flow (electrical resistance). Specifically Q is the total heat produced by the Nichrome strip 18, and A is the area of the strip; $t_1$ is the temperature of the hot junction; $t_m$ is the temperature of the cold junction which is at the temperature of the fluid medium; $R_W$ is a constant resistance depending upon the physical construction of the device and in general includes resistance $R_2$ in FIG. 13; and $1/h$ corresponds to $R_3$ in FIG. 13, $h$ being the fluid conductance. Thus, the expression $t_1 - t_m$, a temperature difference, is proportional to the output voltage indicated by meter 22 in FIG. 13. This expression also indicates the necessity or desirability of making the heat flux constant since otherwise the output voltage is effected accordingly.

Considering turbulent flow conditions, the above expression $h$ is directly proportional to the Nuselt number $N_u$ which is equal to $$N_u = \frac{hD}{k}$$

where D is the diameter of the tube and $k$ is the thermal conductivity of the specific fluid under consideration.

Also, the above expression $h$ is directly proportional to the .8 power of the Reynolds number and also the .8 power of the fluid rate expressed in, for example, pounds per hour in the case of ordinary fluids.

In this regard, the fluid heat conductivity, $h$, may be equated for long heating sections as follows; for shorter heated sections a Latzko type solution would be applicable.

$$\frac{hD}{k} = .023 \, R_e^{.8} P_r^{.4}$$

where $R_e$ is the Reynolds number equal to $$\frac{4W}{\pi D u g}$$

and $P_r$ is the Prandtl number equal to $$\frac{uC_p}{k}$$

where

W is the fluid weight per unit time,
$u$ is the absolute viscosity of the fluid,
$g$ is the acceleration of gravity,
$C_p$ is the fluid heat capacity,
D is the diameter of the duct,
$k$ is the thermal conductivity of the fluid.

These relations are based on the fact that in turbulent flow there is both heat convection and heat conduction in the fluid with the convection predominating. Other considerations are required in the case of laminar flow (established flow along strata) since heat flow is substantially entirely then by conduction in which case the Reynolds number is no longer directly proportional to the fluid conductance, $h$, and hence the minus .8 power relationship depicted in FIG. 14 is not applicable to laminar flow. Some means are therefore required or desirable for the arrangement of FIG. 6 to produce more meaningful readings in the laminar flow condition. Such means involves, as described above in connection with FIG. 4, the helical or spiral arrangement of thermocouple elements in contrast to the axial arrangement of thermocouple elements in FIG. 6. A significant feature of the spiral arrangement in FIG. 4 is that there is a new entrance region at each spirally arranged hot junction.

Applying entrance region heat transfer theory to this particular spiral arrangement, in FIG. 4 it can be demonstrated that under such conditions a mathematical expression, using a Leveque mathematical treatment, can be developed where the fluid heat conductance now expressed as $h_x$ for laminar flow is directly proportional to the .3 power of the Reynolds number and corresponding the .3 power of $W$, the fluid weight per unit time.

It is further desirable that the system produce meaningful readings immediately at the transition region between turbulent and laminar flow, i.e. immediately in the region of point 72 in FIG. 14, and this involves generally and mathematically speaking making the quantity $h$ above for turbulent flow equal to the quantity $h_x$ for laminar flow substantially equal at the condition represented by point 72 in FIG. 14. This latter equality is substantially achieved by properly designing the spiral in FIG. 4 paying particular attention to the ratio $1/D$ where 1 is the width of the heating strip 18 and D is the diameter of the tube on which it is spirally wound. This ratio is made within the range indicated and preferably such that such width is approximately equal to the diameter of the tube.

By thus making the response of the system as indicated in FIG. 14, i.e. with a minus .8 slope range and a minus .3 slope range with substantially no indeterminate region between the same, a system is provided which is universal in its application to different fluids with the same graph of FIG. 14 being applicable to all of such fluids when the ordinates are expressed as the log of the Reynolds numbers and the abscissae are expressed as the log of the reciprocal of the Nuselt number, although there may be a slight variation in line 70 in the case of different liquids depending upon their Prandtl number; however, such slight variation is substantially absent in the case of liquid metals.

The system responds quickly to changes in flow rate because of the relative low values of heat resistance $R_1$ and $R_2$ (FIG. 13, and included in $R_W$ in the above equation), i.e. the thermal time constant is low and may be considerably less than one tenth of one second thereby making recordings made with a fast moving "stylus" as, for example, a cathode ray beam or light beam meaningful of exact transient conditions in fluid flow averaged out by the joint sensing of the multiplicity of hot junctions.

When fluid flows in a duct, oscillations or local distortions in the velocity profile occur. If a single sensing element exists, or if flow is sensed in a local region alone, these fluid flow instabilities are reflected in the sensor signal. In the present structure, however, the sensors exist over the whole length of the flow tube, the spiral arrangement of the junction being particularly advantageous, and the resulting signal will indicate a mean or average value during such distortions in the velocity profile. In use, these calibrated flow devices give excellent response stability and signal accuracy.

Due to the large number of junctions, a very low heat applied to hot junctions 14 provides an ample temperature differential between hot junctions 14 and cold junctions 16 for measurable voltage outputs. The number of junctions is large enough that only a very small heat flux and corresponding temperature difference between hot and cold junctions need exist in order to get a practical electrical signal from the thermopile. To provide the same sensitivity, the heat applied to the hot junction of a single thermocouple, or a flow meter with relatively few junctions, would have to be greatly increased. Under these circumstances, the increased heat would heat the fluid sufficiently to generate appreciable free convection currents between hot and cold junctions and would make it impossible or difficult to measure low flow rates. Consequently, the instant invention is capable of measuring very low flow rates that single thermocouple flow meters, or flow meters employing only a few junctions, are incapable of measuring. For example, a flow meter having five hundred junctions has been demonstrated as capable of measuring a flow rate through a range of $10^5$, that is, flow as slow as one drop in 15 seconds in a one inch diameter conduit to a very rapid flow rate 100,000 times as great.

Of course, the tube is made of material compatible for prolonged use with the particular fluid handled by it and may be, for example, of stainless steel, of ceramic nature such as for example aluminum oxide, and may have a wall thickness of, for example, from .002 inch to .015 inch bearing in mind the thickness has some effect on the thermal time constant, the mass of the material being analogous to electrical capacitance and the thermal conductance being analogous to electrical conductance and the thermal time constant being expressed in terms of the product of these two.

Prior to use, the arrangement of FIGS. 4 and 6 is preferably calibrated for most accurate readings. In such calibration for achieving a so-called "zero reading," the tube ends are left open (in the case of air flow determinations) and filled with the fluid in its static, i.e. nonflowing condition, and heat is supplied to strip 18 to produce the constant heat flux; and under this zero flow condition, there will be a reading on the indicating meter which is considered to be its "zero" reading. During fluid flow conditions, the same constant heat flux is supplied with the fluid in all cases (including the above zero flow condition) always taking away the same amount of heat. The hot junction is the warmest with such zero fluid flow condition, and thus it may be said that fluid flow results in a cooling action on the hot junction even though the same amount of heat flux passes through the hot junction.

While FIG. 6 shows a spiral arrangement achieved by spirally winding the heating strip, but other structural arrangements may be used to produce the same result, for example the junctions may be mounted on a flexible card and made to conform with the exterior of the tube, and such arrangement is particularly useful in larger size tubes.

The structure described may be produced in miniature or larger sizes dependent on application. The duct fluid flow meter may be inserted in supply lines and other devices for measuring and indicating the flow rates of any fluid, such as water, oil, blood, liquid metal, fused salts, air, and other gases. The smooth inner surface of the duct provides means for measuring flow rate without disturbing the fluid under measurement, a particular advantage over prior art devices using internal probes and the like. Also the fact that the device incorporates no moving element such as a movable liquid column is an advantage.

Apparatus embodying the instant invention as a large conduit flow meter or relative speed indicator for both waterborne and airborne vehicles is illustrated in FIGS. 7 and 8. Here the basic thermopile structure of FIG. 2 is retained, but the supporting structure is different from that of FIGS. 4–6. The thermopile comprising wire 10, plated sections 12, heated junctions 14, cold junctions 16, and heating element 18 is wound in zig-zag or spiral fashion on flat plate 46. Plate 46 may be of any suitable electrically insulative material such as plastic or fiberboard. Referring to FIG. 8, the structure just described is potted in a suitable material, such as an epoxy, and mounted on a supporting plate 50. The face of the thermopile is covered with thermally conductive plate or sheet 52. Plate 50 includes means, not shown, for mounting the entire structure inside aqueducts or in suitable locations on the outer surface of the hull of waterborne vessels or the fuselage or wings of aircraft so that outer plate or sheet 52 comes in thermal contact with the surrounding medium, whether water, air, or other fluids. Terminals 20, 21, 23, and 24 are connected as shown in FIG. 2, and device 22 is calibrated to indicate fluid rate of flow or vehicle relative speed, dependent on use.

Figure 10:
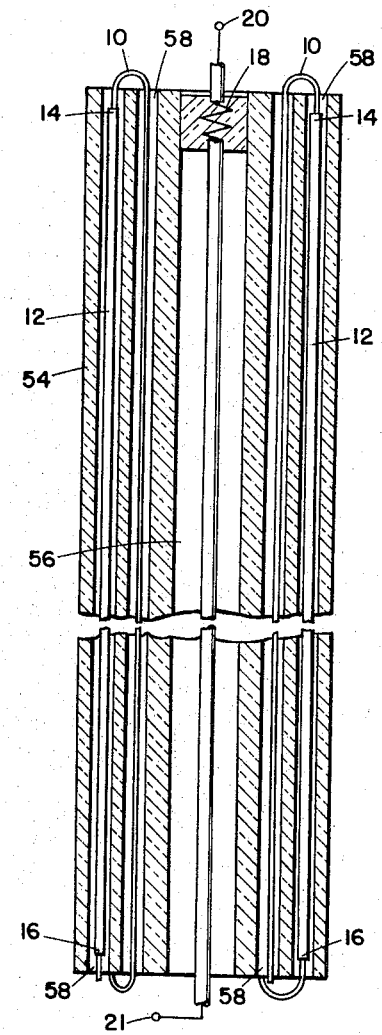
FIG. 10 is an enlarged sectional view taken on line 10—10 of FIG. 9.

In FIGS. 9–12, two embodiments are illustrated embodying the instant invention in wind force indicators as in anemometers or, as previously described, in fluid flow and vehicle relative speed indicators. In the embodiment of FIGS. 9 and 10, rod 54 has a central, longitudinal bore 56, and a plurality of radially spaced, longitudinal bores or channels 58. The thermopile, as illustrated in FIG. 2, is wound in channels 58 with all hot junctions 14 at one end and all cold junctions 16 at the other end. Heater element 18 is disposed longitudinally in one end portion of bore 56 adjacent to junctions 14. Rod 54 is composed of electrically insulative but thermally conductive material, such as ceramic, plastic, or the like.

With specific reference to FIGURE 10, it is observed that the heater 18 is at the same end as the series of thermocouples 14 whereas the related series of thermocouples 16 is at the other end of the rod 54. Because the thermocouple 18 is spaced relatively close to the series of thermocouples 14 and remote from the series of thermocouples 16, the heater 18 produces a heating effect on the series of thermocouples 14, a like heating effect on thermocouple 16 being absent because of the fact that the series of thermocouples 16 is spaced at the other end of rod 54. In other words, while relative movement between the rod 54 and a fluid has substantially the same cooling effect on both series of thermocouples 14 and 16, only the series of thermocouples 14 receives a heating effect from the heater 18. This is in accordance with the arrangement illustrated in FIGURE 13 described elsewhere herein.

Figure 11:
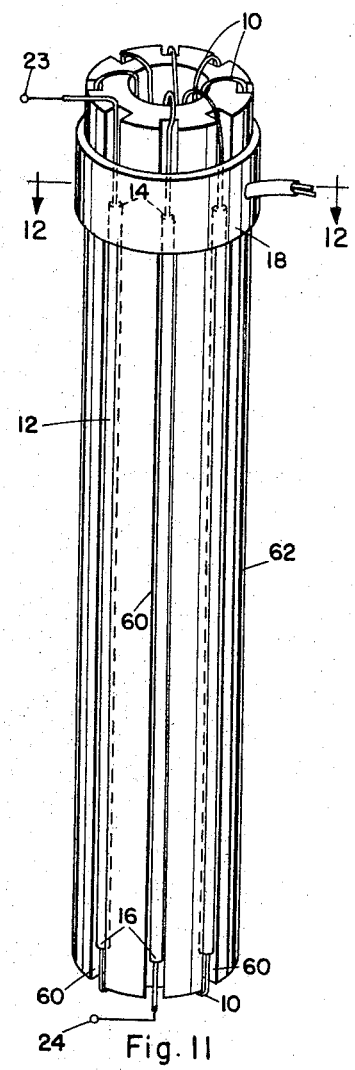
FIG. 11 is a modified form of the rod type in FIG. 9 also embodying features of the present invention.
Figure 12:
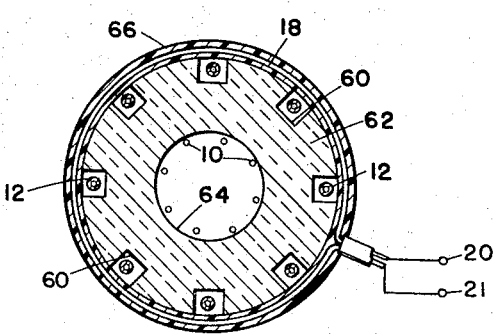
FIG. 12 is an enlarged sectional view taken on line 12—12 of FIG. 11.

The embodiment of FIGS. 11 and 12 is similar to that in FIGS. 9 and 10, except that longitudinal peripheral slots 60 are provided in the outer surface of rod 62 in place of the internal channels 58 of rod 54; and heating element 18 is installed around the circumference of one end portion of rod 62 instead of in the central bore 56 of rod 54. The thermopile of FIG. 12 is wound in slotted channels 60 and central bore 64. An electrically insulative but thermally conductive coating, such as an epoxy, is deposited on rod 62, covering the thermopile and heater element.

Terminals 20, 21, 23 and 24 are provided as in FIG. 2 for connection to a power source and indicating device 22. Indicating device 22 may be calibrated to indicate wind speed, fluid flow rate, or vehicle relative speed, dependent on use. The embodiments of FIGS. 9–12 are particularly useful as anemometers, for which use the device is designed to indicate wind speed from any direction; and, since the output is electrical, the rod may be located in any distant location remotely from the indicator. They also are useful as fluid flow meters or vehicle relative speed indicators, supplementing the embodiments of FIGS. 4–6 and 7–8 in a specific environment in which one or another may be especially suitable.

It will be appreciated that the geometry may be other than a tube, plate or rod to incorporate teachings of the present invention.

In addition to mounting on the side of a vehicle, such as, for example, a boat, automobile, aircraft for measuring velocity, the invention may be incorporated in other systems.

In measuring or determining respiratory rate, the tube arrangement of FIG. 6 may be one inch in diameter, be four inches long, and may be incorporated in a respirometer. In such case, the breathing rate may be audibly or visually monitored or recorded with a current or voltage responsive signalling means operated when a person inhales and also when he exhales. Similarly, the same may be incorporated in basal metabolism measuring apparatus.

In a stall indicating system in an aircraft, one of the plate constructions of FIG. 7 may be mounted above a wing and also one is mounted below the same wing to produce indications of conditions at these two locations. These two indications in the form of either voltage or current signals may be combined in a differential sense, i.e. electrically subtracted one from the other to produce a visible indication or alarm when the difference in such two signals exceeds a predetermined amount indicative of the approach of an undesirable aerodynamic condition.

Also, the invention is productive of a system for producing determinations of fuel consumption in which case the arrangement of FIG. 6 is in the fuel line of, for example, an automobile in which case the indicating device may be, for example, a milli-voltmeter having manually adjustable sensitivity, adjustable to speeds of, for example, 30, 50 and 70 miles per hour so that at the corresponding speed the meter reads directly the gas consumption in terms of miles per gallon at the corresponding speed. Alternatively, the electrical signal from the device of FIG. 6 together with, for example, an electrical signal from an electrical tachometer of the same automobile may be combined as the voltage and a current signal to a watt-hour movement to obtain the product of the same as an indication of fuel consumption in terms of gallons per unit distance or unit engine revolution.

When the arrangements of FIGS. 7 and 8 are used, the same are mounted so that the expectant fluid flow is either longitudinally, transversely or diagonally of the same and calibrated accordingly, it being noted that the fluid flow should be tangential and not perpendicular with respect to the plane of the plate.

In the case of the rod constructions, the same may be oriented in any direction with respect to the expectant fluid flow, although usually such that the fluid flow direction is radial with respect to the rod. While the plate construction may be recessed to lie generally "flat" with respect to a surface, the rod is preferably arranged to project into the expectant fluid flow. The rod and plate constructions are useful for both turbulent and laminar flow determinations with each operating essentially in the corresponding .8 power and .3 power regions depicted in FIG. 14.

The input heating power of one watt or less mentioned previously is cited as an example and such heating power may be in that order for tubes or ducts having an internal diameter of, for example, one quarter inch to one inch and may be larger for larger ducts, for example, ten watts or more for ducts of six inch diameter and diameters larger than six inches.

The reference above to minus the .8 power is applicable to ordinary fluids in turbulent flow, and this power is somewhat less in the case of liquid metals in turbulent flow due to free electrons in liquid metal, being in this latter case generally minus $7/15$ or minus .47. For laminar flow the exponent or power minus $1/3$, i.e. minus .33, is the same in both the case of ordinary fluids and also liquid metals. However, in the case of turbulent flow of liquid metals the exponent minus .47 increases with flow and approaches the minus .8 value as indicated by the non-linear dotted line 70A in FIG. 14 in the turbulent flow region.

Further, the hot and cold junctions may optionally be produced using vapor deposition or plasma spraying techniques each of which are described specifically in connection with FIGS. 15 and 16 wherein two different complementary thermoelectric metals A and B are so formed each with a thickness of, for example, one-tenth of one-thousandth (.0001″) inch thickness on a tube 80 of electrical insulating material or metal material coated with an electrical insulating material and, as discussed above, the materials may be so formed on the tube in a spiral manner using masking techniques to produce what may be termed a "barber pole" appearance with the materials A and B abutting or slightly overlapping along the spiral line 82. After the metals A and B are so formed, the tube may be placed in a lathe adjusted to produce a screw thread type or spiral cut to produce the spiral grooved portion 84 illustrated in both FIGS. 15 and 16. This spiral cut has the effect of making a spiral conductor of metals A and B avoiding the necessity of spirally winding a wire. In this case, there are produced two junctions per circumferential extent of metal, one of which is used as the hot junction and the other is used as a cold junction. The hot junctions are illustrated at 85 in FIG. 15, and a heating Nichrome strip is spirally wound around and over such hot junctions with suitable electrical insulation between the same, as described previously. This construction has the additional advantage that the response time is enhanced due to the thinness of the metals A and B contrasted to the larger mass of comparable spiral wires and their metal coatings in the previous figures.

While the preferred embodiments specifically illustrated in the drawings include a cold and a related adjacent hot junction being generally diametrically disposed, i.e. disposed 180 degrees circumferentially, the circumferential spacing may be less than 180 degrees as, for example, 90 degrees with two hot and two cold junctions in such latter case being equally spaced in the entire 360 degree circumference. Further, the related adjacent cold and hot junctions may be displaced somewhat axially along the tube as in the case of the spiral winding of FIGS. 4 and 6 and also the comparable spiral winding of FIG. 15, the related and adjacent cold and hot junctions need not so be axially displaced along the length of the tube using the previously described arrangement wherein the junctions are mounted on a card.

Also in some cases, for example, on large diameter tubes or ducts, the thermocouple junctions need not necessarily be equally spaced around the circumference or periphery of the tube or duct but may be mounted to sense conditions along only an axially extending wall portion of the tube or duct.

While the system, as described above, uses changes in voltage or current in response to changes in temperature, the structures described are capable of other uses in other systems. For example, instead of allowing the temperature of the hot junctions to change and using the resulting voltage or current changes, such voltage or current may be maintained constant by changing in input heating power in which case such changes in heating power are used as the flow determinative means. A typical such system is diagrammatically illustrated in FIG. 17 wherein the output of the thermopile system 90 is compared with a constant or adjustable electrical quantity in a comparator 92 that serves in accordance with such comparison to adjust a resistance 94 connected in a series circuit with a heater source 96, the hot junction heater 97 and a meter 98, the meter 98 serving to indicate fluid flow.

In FIG. 18, a like servo system is provided to maintain a constant flow with a valve 100 being automatically adjusted in accordance with a comparison made in comparator 101 between the output of the thermopile duct system 102 and an electrical reference quantity.

While in some instances the hot junctions may be heated by Joule heating by passing an alternating current through the same, it is preferred that the heating of these junctions be accomplished by a separate heater strip so that the use of electrical filters to separate the D.C. output from the A.C. heating current is obviated together with their deleterious effects on the D.C. signal, particularly so under transient conditions, and also to allow the use of uniform hot and cold junctions of the same physical and electrical character thereby facilitating manufacture in simple inexpensive expeditious manners.

The use of a plurality of junctions for these purposes can not be overemphasized and the use of the same arranged in a helix as described has resulted in good useful stable signals particularly in the transition range between laminar and turbulent flow.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. Thermoelectric apparatus for indicating fluid rate of flow, comprising: a duct composed of thermal conductive material; an elongated wire having a given specific conductivity wound helically about said duct and insulated electrically therefrom; a metal plating on alternate sections of said wire, said plating having a greater specific conductivity than said wire; the ends of said sections comprising a first group of adjacently disposed thermocouple junctions, and a second group of adjacently disposed thermocouple junctions circumferentially spaced from the first group; means for heating the junctions in one of said groups; and means connected to the ends of said wire to measure the voltage developed by the temperature difference between said first and second groups, said means being calibrated in terms of fluid rate of flow.

2. Apparatus according to claim 1 in which alternate thermocouple junctions of said first and second groups are disposed diametrically opposite each other and each group of junctions is disposed in a substantially helical pattern adjacent the outer surface of said duct.

3. In a system of the character described, means defining a heat path terminating at one end at a fluid region, a heat source at the other end of said path and producing a constant heat flux through said path into said fluid, temperature sensing means sensing a temperature at an intermediate point in said path, said sensing means being a thermocouple, a second thermocouple sensing the temperature of said fluid, means responsive to the difference in outputs of said thermocouples, the first-mentioned thermocouple being one of a series of hot junctions and said second thermocouple being one of a series of cold junctions, said fluid being conducted through a tube with corresponding ones of said hot and cold junctions being substantially diametrically opposite, different pairs of corresponding hot and cold junctions being circumferentially displaced.

4. A system as set forth in claim 3, including a heating strip spirally wound around said tube and over said hot junctions.

5. A system as set forth in claim 4, including regulating means controlling the heating of said strip to produce a constant heat flux past said hot junctions and into said fluid.

6. A system as set forth in claim 5 wherein the width of said heating strip is within the range of ½ to 1 times the diameter of said tube.

7. A system as set forth in claim 4 in which the width of said heating strip is approximately the same as the diameter of said tube.

8. In a system of the character described, means defining a heat path terminating at one end at a fluid region, a heat source at the other end of said path and producing a constant heat flux through said path into said fluid, temperature sensing means sensing a temperature at an intermediate point in said path, said sensing means being a thermocouple, a second thermocouple sensing the temperature of said fluid, means responsive to the difference in outputs of said thermocouples, the first-mentioned thermocouple being one of a series of hot junctions and said second thermocouple being one of a series of cold junctions, each of said hot and cold junctions comprising conducting materials spirally formed on a tube with adjacent edges thereof abutting on a spiral line, said materials being removed about a spiral line which has a pitch shorter than the pitch of the first-mentioned spiral line.

9. In a system of the character described, means defining a heat path terminating at one end at a fluid region, a heat source at the other end of said path and producing a constant heat flux through said path into said fluid, temperature sensing means sensing a temperature at an intermediate point in said path, said sensing means being a thermocouple, a second thermocouple sensing the temperature of said fluid, means responsive to the difference in outputs of said thermocouples, the first-mentioned thermocouple being one of a series of hot junctions and said second thermocouple being one of a series of cold junctions, said fluid flowing relative to a cylindrical element upon which said hot and cold junctions are mounted with corresponding ones of said hot and cold junctions being substantially diametrically opposite, said hot and corresponding cold junctions of adjacent pairs in different planes being displaced circumferentially with respect to the axis of said element.

References Cited

UNITED STATES PATENTS

| | | | |
|---|---|---|---|
| 2,786,354 | 3/1957 | Martin et al. | 73—204 |
| 2,892,347 | 6/1959 | Laprand | 73—204 |
| 2,983,031 | 5/1961 | Blanchard | 29—155.5 |
| 3,015,232 | 1/1962 | Schnoll | 73—204 |
| 3,056,295 | 10/1962 | Laub | 73—204 |
| 3,082,508 | 3/1963 | Velde | 29—155.5 |
| 3,116,753 | 1/1964 | Howe | 137—487.5 |
| 3,196,900 | 7/1965 | Catheron et al. | 137—487.5 |

FOREIGN PATENTS

| | | |
|---|---|---|
| 44,368 | 10/1934 | France. |
| 44,482 | 11/1934 | France. |
| 45,872 | 10/1935 | France. |
| 761,973 | 1/1934 | France. |

JAMES J. GILL, *Primary Examiner.*

RICHARD C. QUEISSER, JOHN P. BEAUCHAMP, ROBERT EVANS, *Examiners.*

J. C. GOLDSTEIN, *Assistant Examiner.*